(12) United States Patent
Kirkwood et al.

(10) Patent No.: US 8,046,448 B2
(45) Date of Patent: Oct. 25, 2011

(54) SYSTEM AND METHOD FOR INFORMATION SHARING

(75) Inventors: Michael Kirkwood, San Diego, CA (US); Robert Windsor Gillespie, El Cajon, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 744 days.

(21) Appl. No.: 11/591,354

(22) Filed: Nov. 1, 2006

(65) Prior Publication Data

US 2007/0100985 A1    May 3, 2007

Related U.S. Application Data

(60) Provisional application No. 60/733,390, filed on Nov. 3, 2005.

(51) Int. Cl.
*G06F 17/30* (2006.01)
(52) U.S. Cl. ........ 709/223; 709/217; 707/737; 707/741; 707/758; 707/711; 707/713; 707/715

(58) Field of Classification Search .................. 709/223, 709/217–219; 707/711, 713, 715, 758, 737, 707/741
See application file for complete search history.

(56) References Cited

U.S. PATENT DOCUMENTS

| | | | |
|---|---|---|---|
| 4,774,661 A * | 9/1988 | Kumpati | 707/3 |
| 6,163,781 A * | 12/2000 | Wess, Jr. | 707/103 X |
| 6,208,992 B1 * | 3/2001 | Bruckner | 1/1 |
| 6,341,373 B1 * | 1/2002 | Shaw | 717/173 |
| 7,685,105 B2 * | 3/2010 | Rosenblum et al. | 707/715 |
| 2001/0001852 A1 * | 5/2001 | Rovinelli et al. | 703/22 |
| 2001/0034733 A1 * | 10/2001 | Prompt et al. | 707/102 |
| 2002/0026634 A1 * | 2/2002 | Shaw | 717/173 |
| 2002/0032649 A1 * | 3/2002 | Selvarajan | 705/40 |
| 2003/0020739 A1 * | 1/2003 | Cohen et al. | 345/700 |
| 2004/0068516 A1 * | 4/2004 | Lee et al. | 707/103 Y |
| 2004/0128367 A1 * | 7/2004 | Piercy et al. | 709/220 |
| 2004/0221226 A1 * | 11/2004 | Lin et al. | 715/501.1 |
| 2006/0047692 A1 * | 3/2006 | Rosenblum et al. | 707/102 |

* cited by examiner

*Primary Examiner* — Kenneth R Coulter
(74) *Attorney, Agent, or Firm* — John L. Rogitz

(57) ABSTRACT

A distributed system architecture with components each having an autonomous "hub" or dependent "hub" and a related differential indexing method for obtaining data are disclosed.

3 Claims, 1 Drawing Sheet corpus build logic

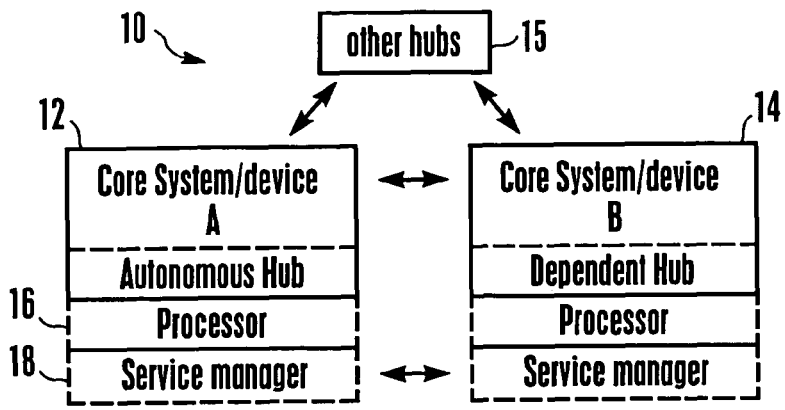
Figure 1
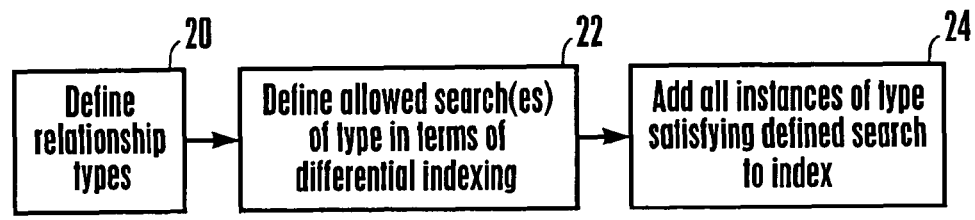
Figure 2  corpus build logic
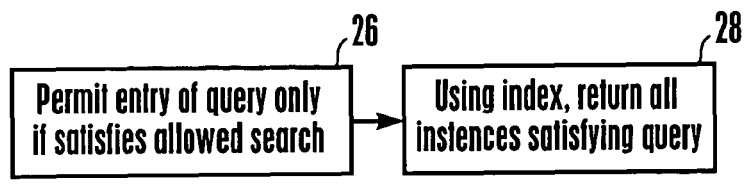
Figure 3  logic for data retreived
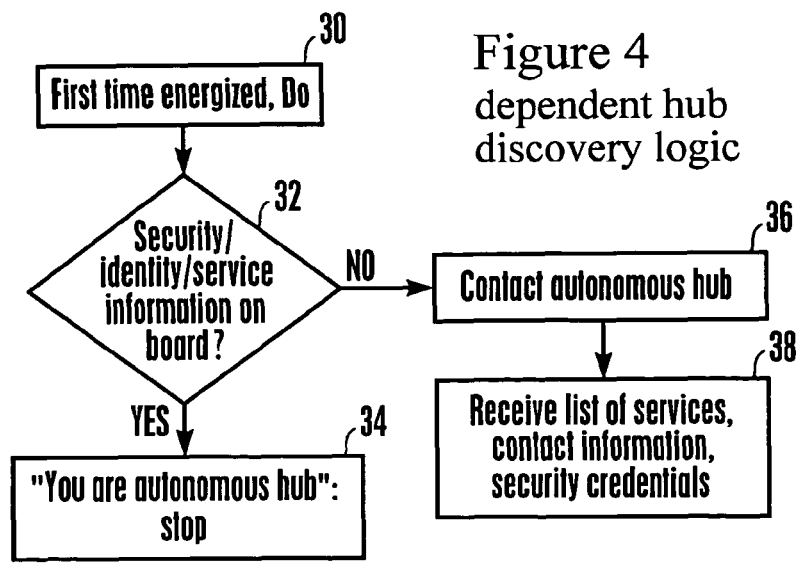
Figure 4
dependent hub
discovery logic

SYSTEM AND METHOD FOR INFORMATION SHARING

This application claims priority from U.S. provisional patent application Ser. No. 60/733,390, filed Nov. 3, 2005, incorporated herein by reference.

FIELD OF THE INVENTION

The present invention relates generally to systems and methods for information sharing.

BACKGROUND OF THE INVENTION

In today's linked computing environment, information must be exchanged between networked systems. As recognized herein, information exchange desirably is done in a way that enables the delivery to be predictable, secure, and transferable while maintaining synchronization to the information source, the medium, and the receiver. Such an all-encompassing data sharing framework should be designed to enable the communication and processing of data at a high rate and large scale.

As also understood herein, an ideal information sharing framework should also provide not only for sharing information in many environments, but also provide for the ability to have a self-managing system manage application integration, merge computing layers into one engine, and reduce total data volume and redundancy of data while scaling and synchronizing data to where it is needed. With the above recognitions in mind, the invention herein is provided.

SUMMARY OF THE INVENTION

A system is disclosed that has a first system device having an associated autonomous hub and a second system device having an associated dependent hub. The dependent hub determines, upon initial power on, whether it possesses sufficient security, self-identification, and function information, and if not, the dependent hub contacts the autonomous hub and receives back security, self-identification, and function information.

In non-limiting implementations each hub includes a respective processor controlling access to associated data and managing creating, reading, updating, and deleting (CRUD) data, and a respective service manager handling incoming calls to and outgoing calls from the hub and containing business logic specific to the functions of the hub. Data of a hub may be arranged as a series of data hierarchies connected through a series of relationships that join object concepts in the hierarchies together to express at least one relationship type.

A relationship type can be defined for data indexing in a hub. Differential indexing may be undertaken for each type, with the differential indexing indicating sequential locations of type elements in the type. Allowed searches are then defined in terms of differential indexing. Then, all instances of the relationship type that are resident in data available to the hub and that satisfy the defined searches can be added to indices prior to any incoming query for data.

In another aspect, a method for data storage includes defining a relationship type, with a relationship type being of the form "entity 1_has_relationship_to_entity 2" wherein "entity 1", "has", "relationship", "to", and "entity2" are elements of the type. The method also includes assigning each element a number indicating the sequential position of the element in the type, and defining at least one allowed search for instances of the type based on the numbers. Also, the method includes identifying all instances of the relationship type that are resident in available data and that satisfy the defined search. The instances are added to indices prior to any incoming query for data.

In yet another aspect, a system has at least a first system device having an associated autonomous hub and at least a second system device having an associated dependent hub. The dependent hub executes means for determining, upon initial power on, whether it possesses sufficient security, self-identification, and function information, and if not, the hub executes means for contacting the autonomous hub and receiving security, self-identification, and function information therefrom. Data of a hub is arranged as a series of data hierarchies connected through a series of relationships that join object concepts in the hierarchies together to express at least one relationship type.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of a non-limiting system in accordance with present principles;

FIG. 2 is a flow chart of non-limiting logic for building an indexed corpus;

FIG. 3 is a flow chart of non-limiting logic for retrieving results from the corpus; and FIG. 4 is a flow chart of non-limiting logic by which a dependent hub can discover its function.

DETAILED DESCRIPTION OF THE PREFERRED EMBODIMENT

Referring initially to FIG. 1, a system is shown, generally designated 10, which includes what is referred to herein as a first Central Orthogonal Relationship Engine (CORE) system or device 12 with an associated software-implemented autonomous hub in accordance with disclosure below and a second CORE system or device 14 with an associated software-implemented dependent hub in accordance with disclosure below. Other dependent and autonomous hubs 15 may also be provided, with the hubs communicating with each other via a wide area network such as the Internet. Each CORE system or device includes a respective CORE engine containing data and a core processor 16 (which builds and maintains the data, its indices, and data access). The processor controls 16 controls access to the data. The processor 16 may also embody or implement a content master component that both holds the data as well as manage the logic of creating, reading, updating, and deleting (CRUD) data.

Each core system or device also includes a respective service manager 18 which exposes data of the respective engine and also exposes the functionality of the particular system/device to distributed applications. In some implementations the service manager 18 is the only way the engine can be accessed. In non-limiting embodiments the service manager 18 handles incoming and outgoing calls, and it contains the business logic specific to the various services offered by the hub.

Accordingly, as can appreciated in reference to FIG. 1, the system 10 can be replicated across geographies to optimize usage through both proximity and local context-specific content. As mentioned above, two hub types are provided. An autonomous CORE hub contains both of the above-mentioned logical components 16, 18 with the engine 16 containing all necessary security information, service information, searchable data, etc. for the hub to act autonomously. In contrast, while a dependant hub also contains both system components 16, 18, the initial data in the processor 16 is not enough for a dependent hub to know its security restraints, and/or know its services offered, and/or return full query results. Accordingly, a dependent hub must contact another hub in the system 10 to get this information in accordance with logic discussed below in reference to FIG. 4.

Both of the above hub types are replicated across the system 10. A dependant hub may be used both for applications that want access to the CORE system 10 (services consumer) as well as applications that want to provide services through the CORE system 10 (services publisher). An autonomous hub is used as a gateway into the CORE system 10 by providing data referred to herein as CORE data "CRUD" (for "create, read, update, delete" operations) as well as facilitating communication between consumers and publishers. A hub of either type may be used in a stand-alone device, such as in a consumer electronic component or a handheld device such as a telephone.

The core system described above is infinitely distributable using several different approaches, including distribution of a subset of the total data and distribution of a copy. This enables the data of the world to be joined and independent at the same time while rippling key changes across the networked systems.

There is a key premise to all of the ability to overcome: that a core engine acts as a master for the objects that communicate with it, even though the objects may be created using a variety of techniques (including existing code and applications). This approach enables the idea that each object can carry its own identity and also participate in a global network where all identity's are known, shared, and secured by a series of real-world relationships between them.

In one non-limiting embodiment, the processor 16 and service manager 18 may be implemented as a Java application running on IBM's Websphere, and may be Java compiled classes packaged into a WAR file that can run in any servlet container, such as Apache's Tomcat.

Now referring to FIGS. 2 and 3, data in a CORE engine processor 16 can be accessed through indices in accordance with the following discussion. Two types of indexing may be provided, namely, individual concept indexing such as indexing by parent ID, category ID, and normative name, and, as illustrated in FIGS. 2 and 3, a novel relationship index that is differential-driven. In this latter type of indexing, when a relationship type concept is added (typically based on business logic in the service manager 18), the combination of relationship members that can be searched is registered at the same time. Thus, the results to all possible (permitted) searches are pre-calculated, meaning no searching must be done for data requests. Instead, searching is done by passing in the relationship type sentence with certain members of the sentence substituted with the desired search criteria.

Commencing at block 20, relationship types are identified. As an example, a relationship of the type "Person_Has_Role_At_Company" can be defined. Because each member of the sentence defining the relationship type can be represented by its sequential position in the sentence, the word "person" can be represented by the numeral "0", the word "has" is represented by the numeral "1" the word "role" is represented by the numeral "2", and so on.

Next, at block 22 allowed searches are defined in terms of the above differential numbering. As an example, suppose searches focused on the differential indices "2" and "4" are defined to be permissible. This means someone could search for values replaced in the "2" and "4" positions in the relationship type.

Proceeding to block 24, all instances of the relationship type that are resident in the data available to the processor 16 and that satisfy the defined searches are added to the indices. Any new data instances/children of that type that are added to the data store are immediately added to the indices for all registered searches of that relationship type to establish a hierarchical data structure. Thus, the results of a permitted search are pre-prepared and waiting.

Continuing with the above example, relationship instances that might be added at block 24 are "John Smith_Has_Employee_At_Sony" and "Sam Jones Has_Employee_At_Sony", and in a non-limiting implementation the specific instances are added as children to the above relationship type to establish a hierarchical data structure. Because the specific instances are of the above relationship type defined at block 20 and a "2_4" index addition was registered at block 22, the specific instances are added to the index with "Employee_Sony" (the "2_4" member combination) as a searchable key.

In one non-limiting implementation, the indices may be structured as nested array lists of pointers to the data concepts within an "index hierarchy" of hash indices stored in hash map Java objects that allow retrieval of objects by a key. A non-limiting example is:

Hash Map(Key of [Relationship Type ID] Paired to Value of
   Hash Map(Key of [Concatenated "Diff" Members' Positions] Paired to Value of
     Hash Map(Key of [Concatenated "Diff" Members' Normative Names] Paired to Value of
      Array List([Concepts for this specific search]))))
1. EXAMPLE: Using the above examples, if the relationship type to be searched against is "Person_Has_Role_At_Company" and a registered (permitted) search sentence query is "Person_Has_Employee_At_Sony" . . . then the structure of the index would be:
[relationship type ID (simply id of Concept object like "38")]>>
  2_4>>
    Employee__Sony>>
      [List of Concepts like "John Smith_Has_Employee_At_Sony" &
      "Sam Jones_Has_Employee_At_Sony"

The data in a hub may be objects in an object-oriented language, such as but not limited to a class in Java or C. The following properties description describes how parent-child connections may be specified through object properties such as "Parent ID" rather than through language-specific inheritance which is built-in to various languages.

Every concept has the following key properties among others: unique ID, Normative Name, Category ID, Parent ID. Each concept directly under the root is considered a category, with example categories being Person, Organization, etc. The relationship category is different from other categories in that it stores relationships that tie individual concepts together.

In some embodiments the data hierarchy may be in both Oracle as flat tables and in an XML file on a file system in case of any application downtime. Because the system is language-agnostic and simply uses properties to define the hierarchy, it is easily serialized into XML.

Thus, data is arranged as a series of data hierarchies who members are unique. The hierarchies are connected through a series of relationships that join the objects "concepts" in the hierarchies together to express one type of relationship. The indexing of relationships is a unique capability of the processor 16, providing the ability to enable high performance, flexibility, and real-time updates to the engine.

Now referring to FIG. 3 to understand how the data structure developed using the logic of FIG. 2 may be used, at block 26 a data retrieval sentence/query is entered and processed only if it satisfies one of the allowed search types, e.g., using the above example an allowed search query might be "Person_Has_Employee_At_Sony". In this example, specific desired instances have been substituted into the "2" and "4" differential slots ("Employee" and "Sony"). At block 28, using the indices created by FIG. 2, all instances satisfying the query (in this case, the names of all Sony employees), having already been compiled at block 24 in FIG. 2, are returned.

FIG. 4 illustrates non-limiting logic by which a distributed dependant hub self-discovers its role and security credentials. When a dependent hub "wakes up" or is switched on for the first time at block 30, it first checks its internal engine processor 16 for necessary information at decision diamond 32. This information may include security information, identity information, and service information. Because in a non-limiting embodiment the service manager 18 code is the same whether the hub is autonomous or dependent, the step at decision diamond 30 is necessary. In the event that the test at decision diamond 32 is positive, i.e., the hub possesses the requisite information, the process stops at block 34, wherein a message can be returned that "you are an autonomous hub" if desired.

In contrast, if there is not enough information in the local CORE engine processor, then the logic flows from decision diamond 36 to contact an autonomous hub to retrieve its role as a consumer, a publisher, or both along with essential role and security information at block 38. Not only does a dependent hub obtain a unique hub ID, but also if desired an owner ID identifying the hub's owner, which may be an application, a person, etc. This allows the hub to know its role and purpose. The owner may have to input a password to start up the engine. In any case, having separate hub IDs and owner IDs, when used in electronics devices, allows a person to pass their CORE from one device to another.

In addition, small segments of data can be distributed as CORE hubs to servers, home electronic devices, handheld devices, etc. Distributed segments are created based on the CORE owner's rights and relationship connections. An algorithm extracting the necessary CORE data may be used to create the package. For instance, if a hub is to be used for stand alone operation, all necessary data is packaged for devices that would not have the ability to connect back online to get that information. Such a distributed, stand-alone hub includes security access information, data required for its specific purpose/role, and anything else it would need to act autonomously. However, these types of Hubs would still provide the ability to get additional information if necessary. In any case, a hub can be personalized to its owner, whether that owner is a person, application server, or electronic device. The autonomous hub service thus provides the following to a dependant hub:

1. Where the dependant hub is a service publisher:
    a. A list of services that the calling dependant hub provides.
    b. Information on how to access the dependant hub's host's services' code.
    c. The security credentials for the dependant hub's provided services to allow the dependant hub to self-manage access to its services.

2. Where the dependant hub is a service consumer:
    a. A list of available services offered to that consumer.
    b. The connection details allowing the dependant hub to access the services.
    c. The security credentials that allow the dependant hub to manage how it is accessed by its users.

The system shown in FIG. 1 and configured in FIG. 4 can use the logic of FIG. 3 to transfer necessary information from one hub to another. As an example, suppose a web application A wants to provide weather information to users, but the weather information resides within another Web application B. In this case, a dependant hub is placed on both applications A and B, and application B's human owner publishes its weather service through a system 10 website (for service publishers to manage their services) along with any user restrictions. The hub providing the above website notifies other system 10 hubs of the new service. When application B is turned on, application B's hub immediately calls an autonomous hub to discover its role(s) in accordance with FIG. 4. In this way, application B's hub learns that it provides the weather service and receives both security information and information on how to access application B's weather application code. Code is written onto application A to interface with application A's hub, passing in security credentials and the service it is requesting. At this point, application A can call it's hub, which calls application B's hub, which in turn retrieves weather information in accordance with FIG. 3.

As described above, a CORE engine with processor 16 can be embedded into the storage footprint of an electronic product, including media that is distributable across products. The engine communicates with global network (the remainder of the system 10) that is provided for communicating with all electronic devices and content objects. Alternatively, a corporate CORE engine master can be built for key business objects within the enterprise. Such a system can provide key business processes clean and accurate data view of the enterprise. Also, such a platform provides a data layer for company data and processes to link into, while ensuring a global corporate security solution and process management capability.

While the particular SYSTEM AND METHOD FOR INFORMATION SHARING is herein shown and described in detail, it is to be understood that the subject matter which is encompassed by the present invention is limited only by the claims.

What is claimed is:

1. A computer executed method for data storage, comprising:

defining a relationship type, the relationship type being of the form "entity 1_has_relationship_to_entity 2" wherein "entity 1", "has", "relationship", "to", and "entity 2" are elements of the type;

assigning each element a number indicating the sequential position of the element in the type relative to other elements in the type;

defining at least one allowed search for instances of the type based on the numbers indicating the sequential positions;

identifying all instances of the relationship type that are resident in available data and that satisfy the defined search; and adding the instances to indices prior to executing a query for data.

2. The method of claim 1, wherein the method is executed by both of:
- at least a first system device having an associated autonomous hub; and
- at least a second system device having an associated dependent hub, the dependent hub determining, upon initial power on, whether it possesses sufficient security, self-identification, and function information, and if not, contacting the autonomous hub and receiving security, self-identification, and function information therefrom.

3. The method of claim 2, wherein each hub includes:
- a respective processor controlling access to associated data and managing creating, reading, updating, and deleting (CRUD) data; and
- a respective service manager handling incoming calls to and outgoing calls from the hub and containing business logic specific to the functions of the hub.

* * * * *